United States Patent
Bulat et al.

(10) Patent No.: US 11,946,422 B2
(45) Date of Patent: Apr. 2, 2024

(54) METHOD OF OPERATING A COMBUSTOR FOR A GAS TURBINE

(71) Applicant: Siemens Energy Global GmbH & Co. KG, Munich (DE)

(72) Inventors: Ghenadie Bulat, Lincoln (GB); Kristopher Calladine, Doncaster (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/257,297

(22) PCT Filed: Dec. 13, 2021

(86) PCT No.: PCT/EP2021/085557
§ 371 (c)(1),
(2) Date: Jun. 14, 2023

(87) PCT Pub. No.: WO2022/128959
PCT Pub. Date: Jun. 23, 2022

(65) Prior Publication Data
US 2023/0392557 A1 Dec. 7, 2023

(30) Foreign Application Priority Data
Dec. 16, 2020 (GB) ..................... 2019845

(51) Int. Cl.
*F02C 9/40* (2006.01)
(52) U.S. Cl.
CPC .......... *F02C 9/40* (2013.01); *F05D 2270/082* (2013.01)

(58) Field of Classification Search
None
See application file for complete search history.

(56) References Cited

U.S. PATENT DOCUMENTS

| | | | |
|---|---|---|---|
| 4,589,260 A | 5/1986 | Krockow | |
| 2004/0224268 A1 | 11/2004 | Keller et al. | |
| 2008/0168774 A1* | 7/2008 | Drnevich | F02C 9/26 60/777 |

(Continued)

FOREIGN PATENT DOCUMENTS

| | | |
|---|---|---|
| DE | 102013222225 A | 4/2015 |
| EP | 2873924 A1 | 5/2015 |
| KR | 20160009889 A | 1/2016 |

OTHER PUBLICATIONS

PCT International Search Report and Written Opinion of International Searching Authority dated Apr. 7, 2022 corresponding to PCT International Application No. PCT/EP2021/085557 filed Dec. 13, 2021.

*Primary Examiner* — Katheryn A Malatek (57) ABSTRACT

A method of operating a combustion system (16) for a gas turbine (10), the combustor system (16) comprises a main fuel supply (72, 73), a pilot fuel supply (74), a combustion chamber (38). The method comprises the steps supplying a first fuel flow through the main fuel supply (72) and the pilot fuel supply (74), monitoring a composition of the first fuel, monitoring combustion instability, reducing the first fuel flow through the pilot fuel supply (74) to zero when the first fuel composition has a) a hydrogen content $\geq 5\%$ by volume and/or b) a high-HC content $\geq 5\%$ by volume and the combustion instability <a predetermined value.

18 Claims, 5 Drawing Sheets

(56) References Cited

U.S. PATENT DOCUMENTS

| | | | |
|---|---|---|---|
| 2013/0239543 A1* | 9/2013 | Bridge | F02C 3/20 60/39.463 |
| 2014/0157786 A1* | 6/2014 | Washam | F23N 5/00 60/734 |
| 2014/0238035 A1* | 8/2014 | Knapp | F23N 1/002 60/39.24 |
| 2014/0250908 A1* | 9/2014 | Huntington | F01K 13/02 60/776 |
| 2015/0362194 A1* | 12/2015 | Ogata | F23R 3/286 60/39.463 |
| 2016/0298851 A1 | 10/2016 | Brickwood et al. | |
| 2017/0298838 A1* | 10/2017 | Sathyakumar | F02C 3/04 |

* cited by examiner

METHOD OF OPERATING A COMBUSTOR FOR A GAS TURBINE

FIELD OF INVENTION

The present invention relates to a combustion system for a gas turbine and a method of operating the combustion system and in particular a method of operating a fuel supply arrangement of the combustion system.

BACKGROUND OF INVENTION

Stringent emission regulations and a requirement to burn on a wide range of fuels are forcing manufacturers of gas turbines, particularly industrial gas turbines, to better control combustors to achieve emissions targets whilst also maintaining acceptable combustion performance. Commonly gas turbine combustors having can-annular technology, burn in a lean-premixed manner, employing multiple fuel lines to do so. To prevent high pressure fluctuations (or pressure dynamics) which occur within the combustion chamber, the main pre-mixed flame is supplemented with a pilot flame which aids to the stability of the main flame. The pilot flame may be partially premixed at different loads which commonly results in hot spots, where the flame is rich in fuel, generating high levels of thermal NOx. Additionally, at some operating conditions increased metal temperatures of combustor components are also witnessed as a result of the rich flame.

In typical industrial gas turbine engines, two fuel valves are used, one to control the total fuel flow and the other to determine how much of that total fuel flow is directed into the pilot fuel streams within the individual combustor cans. An intelligent control fuel management system is employed to find the most suitable ratio of main to pilot fuel, however this ratio is exactly the same for all combustor cans in a gas turbine engine. During conventional operation using natural gas, the engine control unit (ECU) requires each combustor to operate with some pilot fuel flow to alleviate problems associated to, load accept/reject, cross burner contamination and the onset of high-pressure fluctuations or combustion instability. Conventionally, when one combustor can of a gas turbine exhibits levels of pressure dynamics above allowable limits, the ECU shuts down the engine.

SUMMARY OF INVENTION

The present invention has at least the following objectives, to lower emissions of the gas turbine engine and particularly NOx, improve combustor dynamics and reduce pressure fluctuations in the combustion chamber, improve combustion stability or reduce combustion instability, to burn high-hydrocarbon fuels, to burn hydrogen-rich fuels, and limit combustion component temperatures.

The above objects are achieved by a method of operating a combustion system for a gas turbine. The combustor system comprises a main fuel supply, a pilot fuel supply, a combustion chamber. The method comprises the steps supplying a first fuel flow through the main fuel supply and the pilot fuel supply, monitoring a composition of the first fuel, monitoring combustion instability, reducing the first fuel flow through the pilot fuel supply to zero when the first fuel composition has a) a hydrogen content ≥5% by volume and/or b) a high-HC content ≥5% by volume and the combustion instability <a predetermined value.

The method may comprise the step increasing the first fuel flow through the pilot fuel supply from zero when either the first fuel comprises a) a hydrogen content <5% by volume and b) a high-HC content <5% by volume or the combustion instability ≥a predetermined value.

The combustor system may comprise an auxiliary fuel supply. The method may comprise the step supplying an auxiliary fuel through an auxiliary fuel supply, wherein the auxiliary fuel may comprise ammonia.

The step supplying an auxiliary fuel through an auxiliary fuel supply may be performed when combustion instability is below a threshold value. Preferably the threshold value is any one of a) a value between 27.5 and 34.5 mbarRMS (0.4 and 0.5 psiRMS) within the combustion chamber, preferably 31 mbarRMS (0.45 psiRMS) within the combustion chamber or b) a value between 20.5 and 27.5 mbarRMS (0.3 and 0.4 psiRMS) external the combustion chamber, preferably 24 mbarRMS (0.35 psiRMS) external the combustion chamber.

The high-HC content may comprise any one or more of the group of fuels comprising hydrocarbon molecules having at least 3 carbon atoms. Fuels comprising hydrocarbon molecules having at least 3 carbon atoms may be from the group comprising propane, butane, pentane, hexane.

At least the first fuel may comprise the hydrogen content 5% by volume comprising a Wobbe Index >40 MJ/Nm³.

At least the first fuel may comprise the high-HC content >5% by volume and comprising a Wobbe Index ≥49 MJ/Nm³.

The predetermined value may be any one of a) a value between 27.5 and 34.5 mbarRMS (0.4 and 0.5 psiRMS) within the combustion chamber, preferably 31 mbarRMS (0.45 psiRMS) within the combustion chamber or b) a value between 20.5 and 27.5 mbarRMS (0.3 and 0.4 psiRMS) external the combustion chamber, preferably 24 mbarRMS (0.35 psiRMS) external the combustion chamber.

The combustion system may comprise a group of combustion chambers. The step reducing the pilot fuel supply to zero may comprise reducing the pilot fuel supply to zero for all the combustion chambers of the group of combustion chambers simultaneously.

The combustion system may comprise a group of combustion chambers. The step reducing the pilot fuel supply to zero may comprise reducing the pilot fuel supply to zero for each combustion chamber independently of the other combustion chambers of the group of combustion chambers.

A total amount of fuel may be the sum of the main fuel supply and the pilot fuel supply. The total amount of fuel, supplied to each combustor, may be constant at a constant demanded output of the combustion system.

The main fuel supply may comprise a main fuel valve for varying the amount of a main fuel to the combustion chamber. The pilot fuel supply may comprise a pilot fuel valve for varying the amount of a pilot fuel to the combustion chamber. The step reducing the pilot fuel supply to zero may comprise closing the pilot fuel valve and preferably opening the main fuel valve.

In another aspect of the present invention there is provided a combustion system for a gas turbine. The combustor system comprises a main fuel supply, a pilot fuel supply, a combustion chamber, a controller, a fuel composition monitor for monitoring the fuel composition of the main fuel supply and/or the pilot fuel supply, a combustion monitor for monitoring combustion instability. The controller is programmed to reduce the pilot fuel supply to zero when the fuel composition has a) a hydrogen content ≥5% by volume and/or b) a high-HC content ≥5% by volume and the combustion instability <a predetermined value.

The main fuel supply may comprise a main fuel valve for varying the amount of a main fuel to the combustion chamber. The pilot fuel supply may comprise a pilot fuel valve for varying the amount of a pilot fuel to the combustion chamber. The controller may be programmed to reduce the pilot fuel supply to zero by closing the pilot fuel valve and preferably opening the main fuel valve.

A total amount of fuel is the sum of the main fuel supply and the pilot fuel supply. The total amount of fuel, supplied to each combustor, may be constant at a constant demanded output of the combustion system.

BRIEF DESCRIPTION OF THE DRAWINGS

The above-mentioned attributes and other features and advantages of the present technique and the manner of attaining them will become more apparent and the presently disclosed combustor and method of operation will be better understood by reference to the following description of embodiments of the present technique taken in conjunction with the accompanying drawings, wherein.

DETAILED DESCRIPTION OF INVENTION

Figure 1:
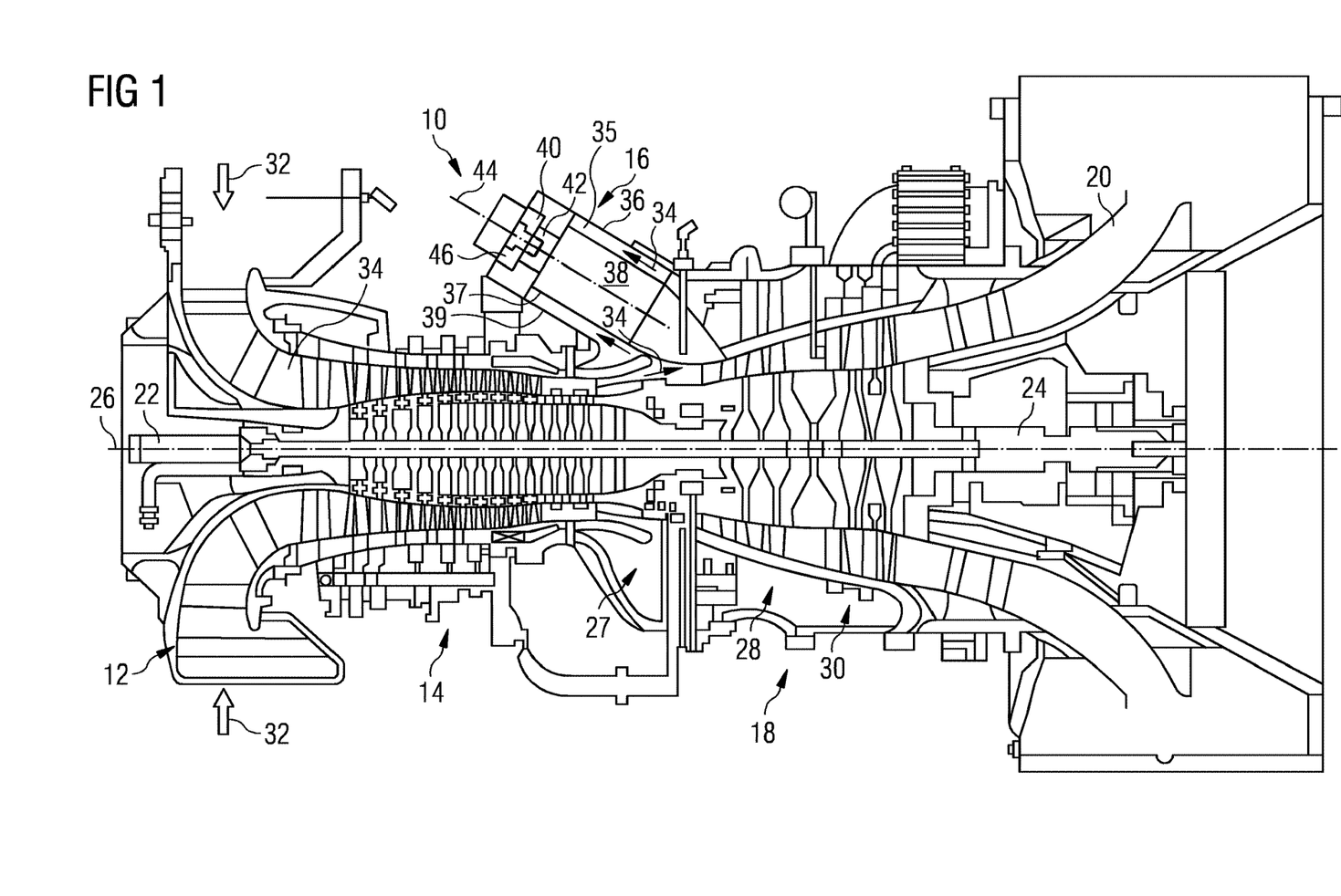
FIG. 1 shows part of a turbine engine in a sectional view and in which the present combustion system is incorporated and in accordance with the present disclosure.

FIG. 1 is a schematic and sectional illustration of a general arrangement of a turbine engine 10 having an inlet 12, a compressor 14, a combustor system 16, a turbine system 18, an exhaust duct 20 and a twin-shaft arrangement 22, 24. The turbine engine 10 is generally arranged about an axis 26 which for rotating components is their rotational axis. The shafts of the twin-shaft arrangement 22, 24 may have the same or opposite directions of rotation. The combustor system 16 comprises an annular array of combustors or combustor cans 36, only one of which is shown. In one example, there are six combustors 36 evenly spaced about the engine 10. The turbine system 18 includes a high-pressure turbine 28 drivingly connected to the compressor 14 by a first shaft 22 of the twin-shaft arrangement. The turbine system 18 also includes a low-pressure turbine 30 drivingly connected to a load (not shown) via the second shaft 24 of the twin-shaft arrangement.

The terms radial, circumferential and axial are with respect to the engine's rotational axis 26 or as otherwise stated for example with reference to a combustor axis 44. The terms upstream and downstream are with respect to the general direction of gas flow through the engine and, as seen in FIG. 1, is generally from left to right.

The compressor 14 comprises an axial series of stator vanes and rotor blades mounted in a conventional manner. The stator or compressor vanes may be fixed or have variable geometry to improve the airflow onto the downstream rotor or compressor blades as is well known. Each turbine 28, 30 comprises an axial series of stator vanes and rotor blades. The stator vanes can be mounted to a radially outer casing or a radially inner drum. The rotor blades are mounted via rotor discs arranged and operating in a conventional manner. A rotor assembly comprises an annular array of rotor blades or blades and the rotor disc.

Each combustor 36 is constructed from two walls, an inner wall 37 and an outer wall 39, between which is defined a generally annular space or plenum 35. At the head of the combustor 36 is a radial swirler 40 which comprises a swirl plate or base plate 45, an annular array of swirler vanes 46 and fuel injection points as will be described in more detail later. The swirler 40 is succeeded by a pre-chamber 42 and then a main combustion chamber 38. These combustor 36 components are generally arranged about a combustor axis 44. The annular array of swirler vanes 46 define swirler slots 47, arranged around the base plate 45.

In operation, air 32 is drawn into the engine 10 through the inlet 12 and into the compressor 14 where the successive stages of vanes and blades compress the air before delivering the compressed air 34 into the combustor system 16. The compressed air 34 flows through the plenum 35 and into the swirler 40. The swirler 40 creates highly turbulent air into which the fuel is injected. The air/fuel mixture is delivered into the pre-chamber 42, where mixing continues, and then into the main combustion chamber 38. In the combustion chamber 38 the mixture of compressed air and fuel is ignited and burnt. The resultant hot working gas flow is directed into, expands and drives the high-pressure turbine 28 which in turn drives the compressor 14 via the first shaft 22. After passing through the high-pressure turbine 28, the hot working gas flow is directed into the low-pressure turbine 30 which drives the load via the second shaft 24.

The low-pressure turbine 30 can also be referred to as a power turbine and the second shaft 24 can also be referred to as a power shaft. The load is typically an electrical machine for generating electricity or a mechanical machine such as a pump or a process compressor. Other known loads may be driven via the low-pressure turbine. The fuel may be in gaseous and/or liquid form.

The turbine engine 10 shown and described with reference to FIG. 1 is just one example of a number of engines or turbomachinery in which this invention can be incorporated. Such engines can be gas turbines or steam turbine and include single, double and triple shaft engines applied in marine, industrial and aerospace sectors.

Figure 2:
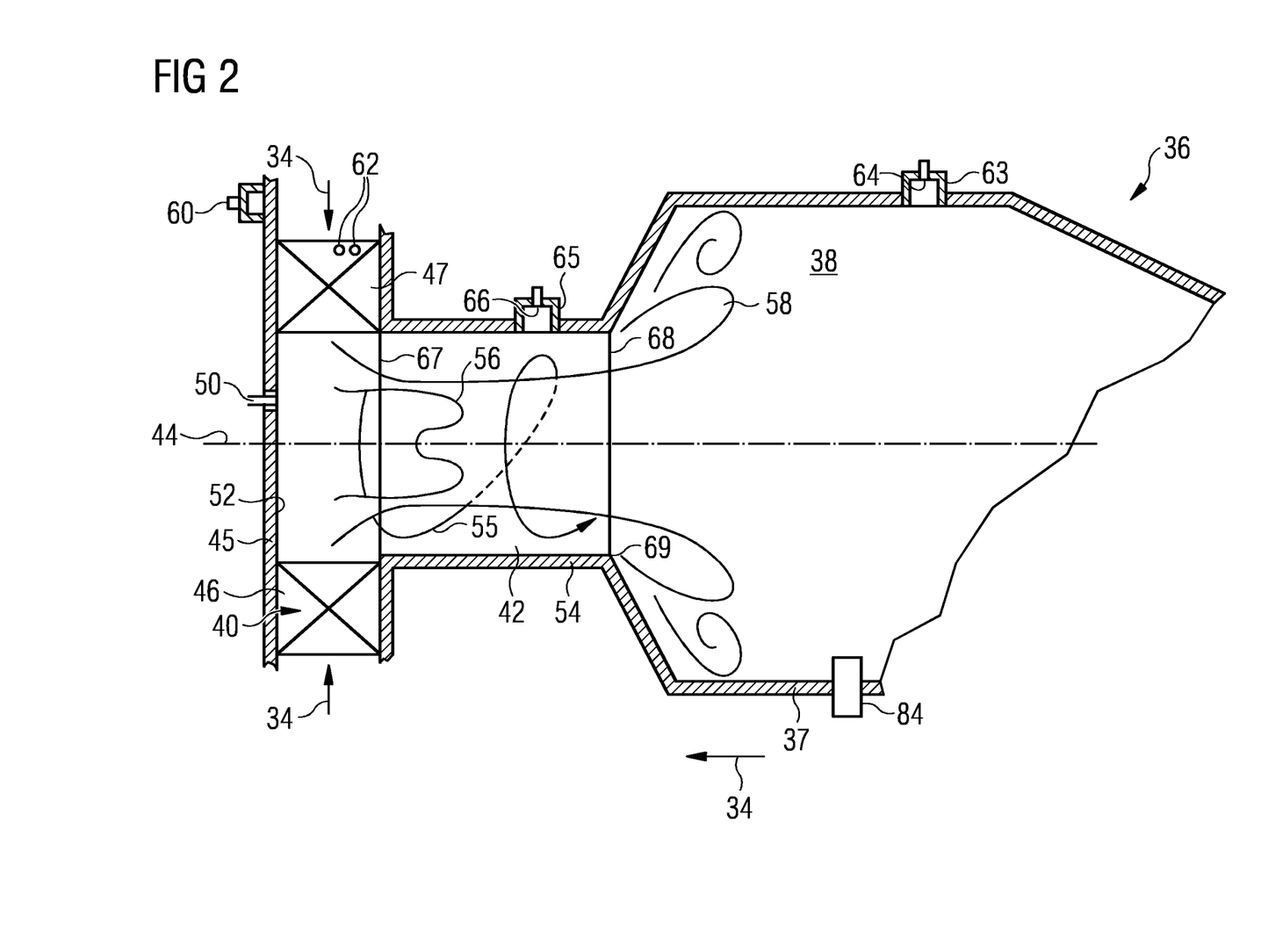
FIG. 2 is a schematic section through a combustor of the combustion system of the gas turbine and is in accordance with the present invention.

FIG. 2 is a cross-section through part of one combustor 36 of a group of combustors of the turbine engine 10 described above and in accordance with the present invention. The radial swirler 40 comprises an annular array of vanes 46, arranged about the combustor axis 44, and which are angled tangentially relative to the combustor axis 44 to impart a swirling flow 55 of mixing air and fuel as is well known. The swirling flow 55 rotates about the combustor axis 44 and flows in a general left to right direction as seen in FIG. 2. The swirler vanes 46 form an array of mixing channels or swirler slots 47 between each consecutive swirler vane 46. The swirler 40 further comprises main fuel injectors 60, 62 for injecting a main fuel and pilot fuel injectors 50 for injecting a pilot fuel. The swirler 40 comprises the base plate 45 which has a pilot surface 52 that faces the pre-chamber 42 and bounds the pre-chamber's upstream axial extent. The main fuel injectors 60 are located in the base plate 45 and the main fuel injectors 62 are located in the swirler vanes 46 and in conventional manner. The pre-chamber 42 is further defined by an annular wall 54 arranged symmetrically about the combustor axis 44. The pre-chamber 42 has an inlet 67 and an outlet 68. The outlet 68 forms or is at a lip 69 of the pre-chamber 42 and defines where the pre-chamber 42 terminates. The pre-chamber's 42 annular wall 54 is then succeeded by the generally annular wall 37 of the main combustion chamber 38. From the lip 69 and downstream the generally annular wall 37 is divergent and opens to define the main combustion chamber 38. The main combustion chamber 38 has a greater cross-sectional area than that of the pre-chamber 42.

As will be described later, the combustor 36 may comprise auxiliary fuel injectors 64 and 66. Auxiliary fuel injector 64 may be located in a recess 63 formed in the annular wall 37 of the combustion chamber 38. Auxiliary fuel injector 66 may be located in a recess 65 formed in the annular wall 54 of the pre-chamber 42. The recesses 63, 65 are optional. The fuel and air entering the recesses 63, 65 create a trapped vortex that premixes the fuel and air prior to entering the combustion chamber 38 or prechamber 42.

There are two distinct fuel/air mixtures and subsequently combustion flames in the combustion chamber 38; a pilot flame 56 is derived from the pilot fuel/air mixture and the main flame 58 is derived from the main fuel/air mixture. The lines indicated 56 and 58 show the flame front and the respective flames continue downstream of the flame front. The pilot flame 56 and the main flame 58 are distinct from one another because of the location of the respective fuel injection points within the air flow 34 in or near to the mixing channel(s) 47. The main fuel injectors 48A, 48B inject main fuel into the swirler slot or mixing channel 47 further away from, i.e. radially outwardly of, the combustor axis 44 than the pilot fuel injector(s) 50. Thus, the respective fuel/air mixtures form substantially different flame regions with the pilot flame 56 generally radially inward of the main flame 58. In this example, the pilot fuel injector(s) 50 is located through the base plate 45 and which is radially inwardly of the swirler 40.

Radial swirlers, as in the case here, have or can be defined as having, a swirl number SN. The radial swirler 40 described above has a SN in the region 0.5 to 0.8. The swirl number can be calculated as is well known in the art, suffice to say here, that the swirl number can be defined by a relationship between the fluxes of angular and linear momentum of the fuel/air mixture. That is to say, the angular momentum relates to rotational velocity about the combustor axis 44 and the linear momentum relates to the velocity in the axial direction along the combustor axis 44. Thus, the SN is defined herein as the ratio of tangential momentum to axial momentum of the fluid or fuel/air mixture.

The SN determines the main aerodynamics of the flow within the combustion chamber and is designed for a typical (conventional) fuel such as natural gas. However, when varying the fuel composition (such as addition of hydrogen or high HC) the SN of a combustor cannot be easily altered. This is clearly detrimental and undesirable and can cause combustion instability and even extinction of the flame, poor combustor dynamics and high pressure fluctuations in the combustion chamber, and increased emissions of NOx (nitrous oxides), sulphur oxides and unburned hydrocarbons amongst other undesirable combustion by products.

The embodiments of the present invention, described with reference to FIGS. 3 to 5, relate to a method of operating the combustion system 16 and in particular a method of controlling the fuel supply to the combustors 36 of the combustion system 16 and a fuel supply arrangement 70 to prevent these undesirable effects, particularly when using high-HC fuels or fuels with a high-hydrogen content. The present invention also relates to the combustion system 16 having the fuel supply arrangement 70 to prevent these undesirable effects, particularly when using high-HC fuels or fuels with a high-hydrogen content.

Figure 3:
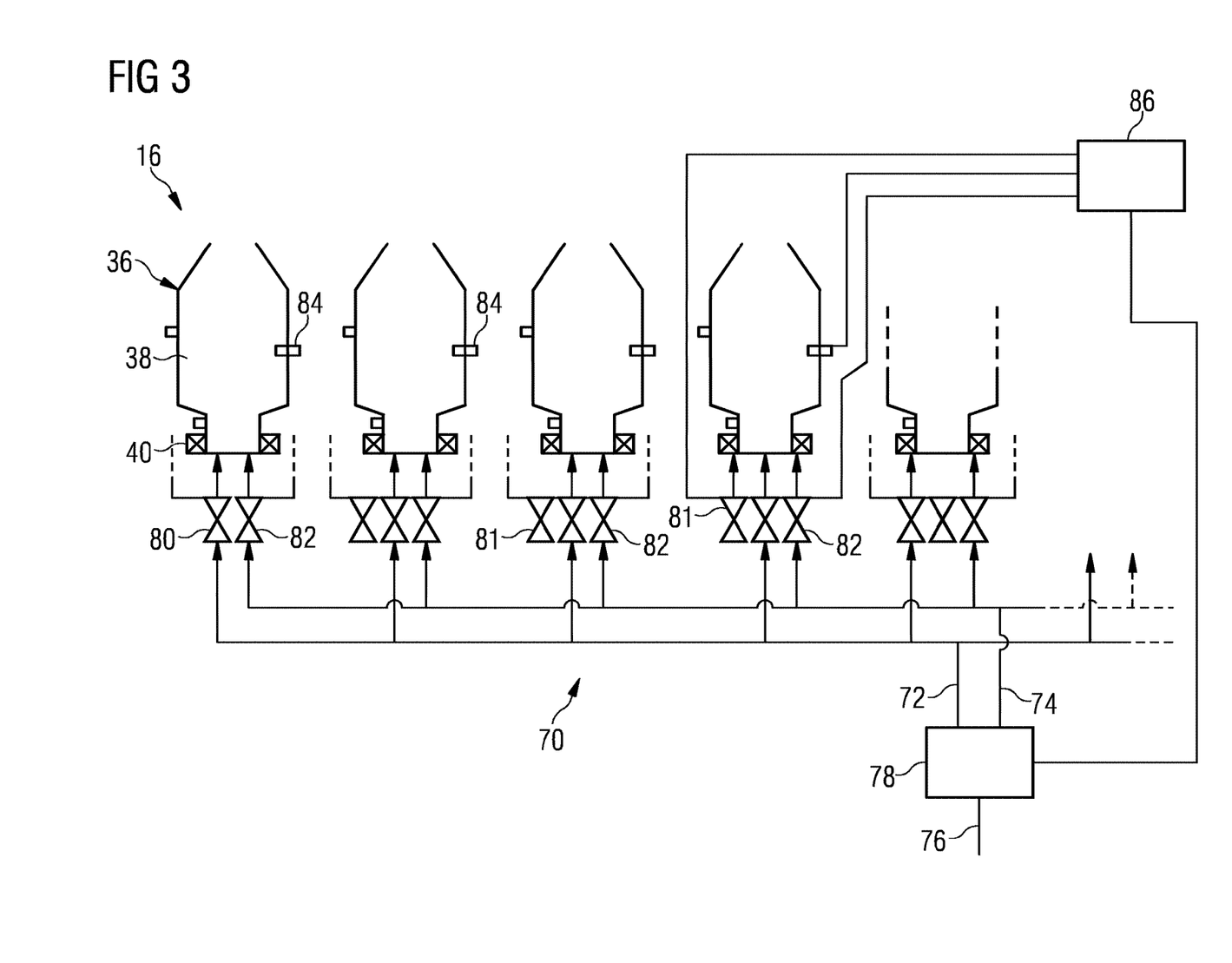
FIG. 3 is a schematic illustration of a first embodiment of a fuel supply arrangement for supplying fuel to the combustors of the combustion system and in accordance with the present invention.

FIG. 3 is a schematic illustration of a first embodiment of a fuel supply arrangement 70 for supplying fuel to the combustors of the combustion system. The fuel supply arrangement 70 comprises a main fuel supply 72, a pilot fuel supply 74, a total fuel supply 76, a fuel composition monitor 78, a main fuel valve 80, a pilot fuel valve 82, a combustion monitor 84 and a controller 86. The main fuel supply 72 supplies a first fuel flow to the main fuel injectors 60, 62. The pilot fuel supply 74 supplies the first fuel flow to the pilot fuel injector 50. Thus, in this embodiment the same fuel is supplied to the main and pilot fuel injectors via respective main and pilot fuel supplies. The fuel passes through the main fuel valve 80 and the pilot fuel valve 82 in the respective main and pilot fuel supplies 72, 74.

The controller 86 is part of the engine's electronic control unit (ECU), but it may be a separate component. The controller 86 comprises software programming which is a part of the overall engine control software. The controller 86 is connected to the fuel composition monitor 78, the main fuel valve 80, the pilot fuel valve 82 and the combustion monitor 84 of each combustor 36. The combustion monitor 84 measures combustion instability via dynamic pressure fluctuations. As mentioned, the combustion system 16 has a number of combustors 36, in this case there are 6 combustors 36 spaced evenly around the engine's axis 26. Each combustor 36 has its own main fuel supply 70 controlled by the main fuel valve 80 and pilot fuel supply 72 controlled by the pilot fuel valve 82 and each main and pilot fuel valve 80, 82 is connected to the controller 86 and is controllable by the controller 86. Each combustor 36 may have at least one combustion monitor 84 and which are each connected to the controller 36.

During operation of the combustion system 16 fuel flowing in the total fuel supply 76 is monitored by the fuel composition monitor 78 for its composition and which is transmitted to the controller 86 and the combustion monitor 84 monitors the pressure fluctuations in the combustion chamber 38 and transmits a reading of the pressure fluctuations to the controller 86. The fuel composition monitor 78 and the combustion monitor 84 continuously transmit to the controller 86.

On engine start-up, fuel is supplied to the pilot injectors 50 in one or more of the combustors 36 and the fuel is ignited. The pilot fuel valve 82 is open. The main fuel valve 80 is closed. When the pilot flame 56 is established in any one of the combustors 36, and there is a demand to increase engine power, fuel is then supplied to the main injectors 60, 62 and the main fuel valve 80 is opened by an amount representative of the demanded power output. When the main flame 58 is established in each combustor 36 the controller 86 determines the status of combustion instability in each combustor 36 and the fuel composition in the main and/or pilot fuel supply 72, 74 or alternatively in the total fuel supply 76. For each combustor 36, if the fuel composition has a hydrogen content ≥5% by volume and/or a high-HC content ≥5% by volume and the combustion instability <a predetermined value, the pilot fuel valve 82 for that combustor 36 begins to close and reduce the pilot fuel supply. In a preferred embodiment, the pilot fuel valve(s) 82 is completely closed and the pilot fuel flow is zero. The total fuel supply 76 remains constant or has negligible change, therefore what would have been the pilot fuel supply quantity is now directed into the main fuel supply and is injected through the main fuel injectors 60, 62. Thus, at a constant demanded output of either the combustion system 16 or the gas turbine engine 10, the total fuel supplied and burned in the combustion chamber 38 also remains constant or very close to constant when the pilot fuel supply 72 is decreased to zero.

During operation, if the fuel composition is detected as having a hydrogen content <5% by volume and a high-HC content <5% by volume or the combustion instability ≥a predetermined value, the pilot fuel valve 82 for any one or more of the combustors 36 is commanded to open thereby increasing the pilot fuel supply sufficient to maintain a pilot flame 56. Here, the total fuel flow remains constant or has negligible change, therefore some of the main fuel supply flow is now directed into the pilot fuel supply flow and injected through the pilot fuel injectors 50.

Each combustion monitor 84 monitors the pressure fluctuations in each combustion chamber 38 and transmits a reading to the controller 86. Alternatively, the combustion monitor 84 monitors the pressure fluctuations (combustor instability) in the plenum 35, immediately external to the combustion chamber 38. The controller 86 is programmed to adjust the pilot fuel supply 74, by opening or closing the pilot fuel valves 82, partly dependent on the pressure fluctuations for each combustor 36. Here, any one or more of the combustors 36 may have its pilot fuel valve 82 closed or open depending on its combustion instability (as well as being dependent on fuel composition). Therefore, any one or more of the combustors 36 may be operating solely on its main fuel supply and a main flame 58 and other combustors 36 may be operating with a pilot fuel supply 72 and a main fuel supply with corresponding pilot and main flames 56, 58 present. However, it is possible that a group of combustors 36 or all of the combustors 36 may have the pilot fuel supply 72 closed or open depending on any one or more of the combustors' combustion instability. For example, when the pilot fuel valves are closed on all of the group of combustors 36 and a combustion instability threshold or value is reached, all of the group's pilot fuel valves 82 are opened.

In addition to monitoring the fuel composition and monitoring combustion instability and then reducing or increasing the pilot fuel supply while keeping the total fuel supply constant, the gas turbine engine's output or power may be utilised as a further threshold to consider before reducing or increasing the pilot fuel supply. Where the engine's power is <30% of maximum power the pilot fuel supply continues unchanged and therefore overrides the changes dependent on fuel composition and combustion instability. This override is because at engine power less than 30% of maximum, reduction of the pilot fuel supply is known to cause potential flame extinction and the pilot flame is required to stabilize the main flame.

Figure 4:
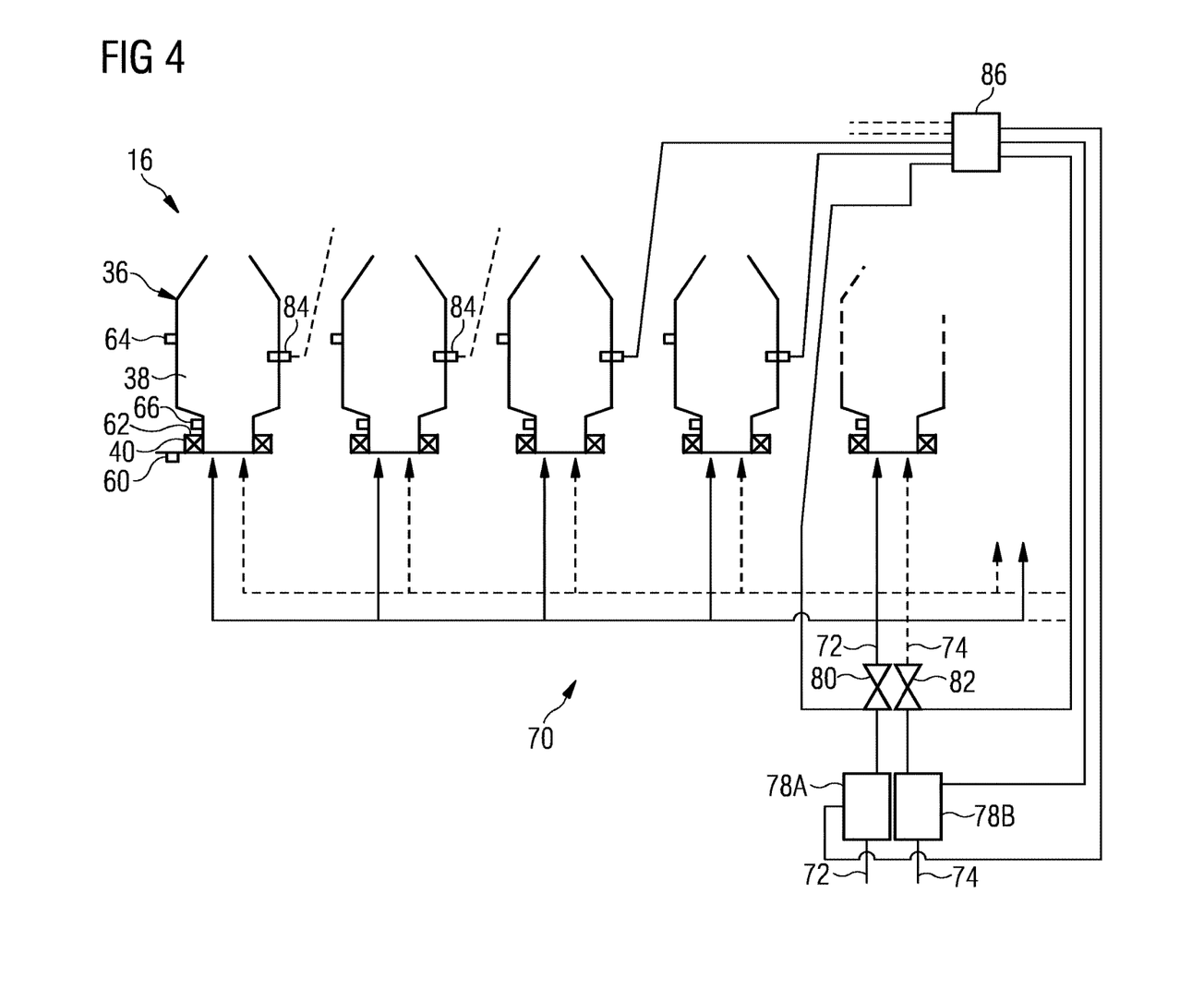
FIG. 4 is a schematic illustration of a second embodiment of a fuel supply arrangement for supplying fuel to the combustors of the combustion system and in accordance with the present invention.
Figure 5:
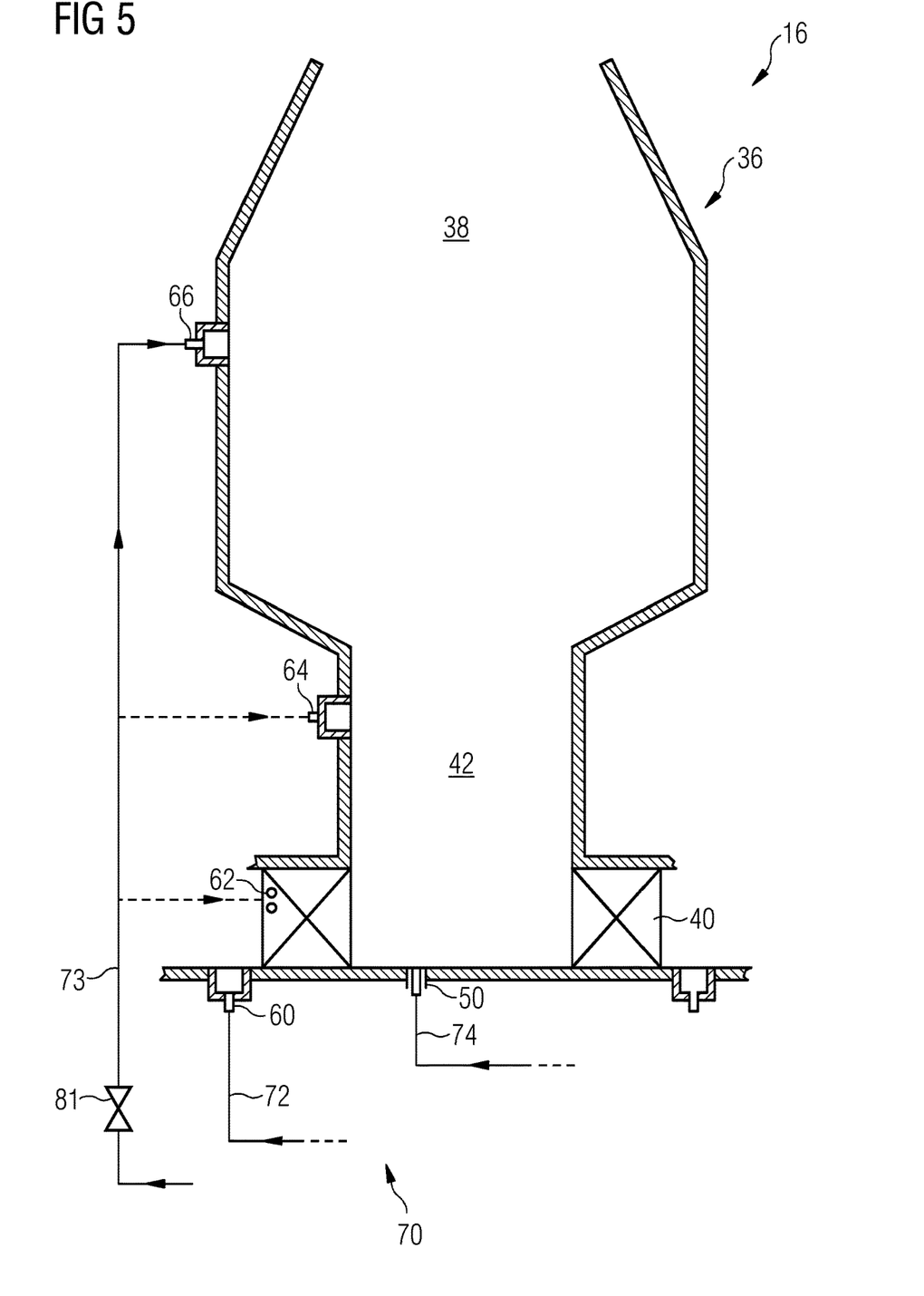
FIG. 5 is a schematic illustration of a third embodiment of a fuel supply arrangement for supplying fuel to the combustors of the combustion system and in accordance with the present invention.

Referring now to FIG. 4 which is a schematic illustration of a second embodiment of a fuel supply arrangement 70 for supplying fuel to the combustors 36 of the combustion system 16. Similar components in this second embodiment have the same reference numbers and operate in generally the same manner as described in the first embodiment except where explained differently.

In this second embodiment of the fuel supply arrangement 70, there is a single main fuel valve 80 on the main fuel supply 72 which supplies main fuel to a group of the combustors 36 of the combustion system 16. There is a single pilot fuel valve 82 on the pilot fuel supply 74 which supplies pilot fuel to the group of the combustors 36 of the combustion system 16. Preferably, the group of combustors 36 are all the combustors of the combustion system 16, but the group of combustors may be any two of more of the total number of combustors 36 of the combustion system 16. Each combustor 36 has a combustion monitor 84 and which each transmit data to the controller 86. Regarding, combustion instability, if the combustion instability is below a predetermined value the pilot fuel supply 74 may be decreased to zero, although also dependent on the fuel composition, for all the combustors 36 of the group of combustors; or detection of combustion instability equal to or above the predetermined threshold causes the controller 86 to either maintain the pilot fuel supply 74 to all of the combustors of the group of combustors or to increase from zero the fuel supply to all the combustors in the group of combustors, dependent on the existing state of the pilot fuel supply 74. In this embodiment, all the combustors 36 in the group of combustors are operated the same. This can be advantageous because all the combustors 36 in the group of combustors will have very similar in-service history and produce very similar thermal outputs giving a constant thermal pattern around the circumference of the engine covered by the group of combustors.

In another aspect of the present invention and shown in FIG. 4, the main fuel supply 72 and pilot fuel supply 74 have separate fuel composition monitors 78A and 78B respectively. The source of fuel may be the same for the main fuel supply and the pilots fuel supply, but the fuel sources may be different. Where fuel sources are different the fuel may have different compositions to each of the main fuel supply 72 and the pilot fuel supply 74. In this example, it is the fuel composition of the main fuel supply 72 that is used in consideration of whether to decrease to zero the pilot fuel supply 74, because it is the instability of the main flame that is important and which is dependent on the fuel composition.

A third embodiment of the present invention is now described with reference to FIG. 5 which shows only one combustor 36 or the combustion system 16 although further combustors may be present for example as per the FIG. 3 and FIG. 4 embodiments. The same features carry the same reference number here as appearing in FIGS. 3 and 4 and function similarly unless otherwise stated. Here, the first main fuel supply 72 supplies the first fuel to the main fuel injectors 60, 62 and the pilot fuel supply 74 supplies the first fuel to the pilot fuel injector(s) 50. The main fuel valve 80 and the pilot fuel valve 82 are connected and controlled by the controller 86 as described herein and the fuel composition monitor 78 measures the fuel composition of the first fuel and relays that information to the controller 86. The arrangement of the main fuel supply 72, pilot fuel supply 74, main fuel valve 80 and pilot fuel valves 82, along with the fuel composition monitor 78 may be that shown and described with reference to either FIG. 3 or FIG. 4. In this embodiment, there is provided an auxiliary fuel supply 73, having an auxiliary fuel valve 81 which is connected to and controlled by the controller 86. As mentioned earlier, the combustor 36 may comprise one or both auxiliary fuel injectors 64 and 66. The auxiliary fuel may comprise ammonia or may be ammonia or may be an ammonia-based fuel such as a blend of ammonia and hydrogen or a blend of ammonia and natural gas.

In the method of operating the combustion system 16 the predetermined value of combustion instability is 31 mbarRMS (0.45 psiRMS) as measured within the combustion chamber 38 or 24 mbarRMS (0.35 psi RMS) as measured external the combustion chamber 38. External to the combustion chamber 38 is preferably immediately external to the combustion chamber 38 and preferably within the plenum 35. For other combustion systems 16 the predetermined value of combustion instability may be between 27.5 and 34.5 mbarRMS (0.4 and 0.5 psiRMS) as measured within the combustion chamber 38 or 20.5 and 27.5 mbarRMS (0.3 and 0.4 psiRMS) as measured external the combustion chamber 38.

As mentioned above, during operation, if the fuel composition is detected as having a hydrogen content 5% by volume and/or a high-HC content 5% by volume then decreasing the pilot fuel supply to zero is considered along with the combustion instability. The high-HC content fuel comprises any one or more of the group of fuels comprising hydrocarbon molecules having at least 3 carbon atoms. Preferably, the high-HC content comprises any one of the group comprising propane, butane, pentane, hexane. Preferably, the high-HC fuel comprises a Wobbe Index ≥49 MJ/Nm$^3$. Regarding the hydrogen content of the fuel, the fuel composition must have a hydrogen content 5% by volume and preferably a Wobbe Index >40 MJ/Nm$^3$.

The pilot fuel valve(s) 82 are very fast acting and can open and/or close within 0.1 seconds, so that very rapid responses to combustion instabilities can be rectified. Further, the main fuel valve(s) 80 may be very fast acting to accommodate redirections of the pilot fuel quantities in order to maintain the constant total fuel flow to each combustor 36.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of operating a combustion system for a gas turbine, the combustor system comprises:
    a main fuel supply,
    a pilot fuel supply,
    a combustion chamber,
    the method comprises the steps
    supplying a first fuel flow through the main fuel supply and the pilot fuel supply,
    monitoring a composition of the first fuel,
    monitoring combustion instability,
    reducing the first fuel flow through the pilot fuel supply to zero when the first fuel composition has
    a) a hydrogen content ≥5% by volume and/or b) a high-hydrocarbon (HC) content ≥5% by volume; and further
    the combustion instability <a predetermined value.

2. The method of operating the combustion system as claimed in claim 1, the method further comprises the step of increasing the first fuel flow through the pilot fuel supply from zero when either the first fuel comprises
    a) a hydrogen content <5% by volume and
    b) a high-HC content <5% by volume or
    the combustion instability ≥the predetermined value.

3. The method of operating the combustion system as claimed in claim 1, wherein the combustor system comprises an auxiliary fuel supply, and the method further comprises the step of supplying an auxiliary fuel through an auxiliary fuel supply, wherein the auxiliary fuel comprises ammonia.

4. The method of operating the combustion system as claimed in claim 1, wherein the step of supplying an auxiliary fuel through an auxiliary fuel supply is performed when combustion instability is below a threshold value, and the threshold value is any one of
    a) a value between 27.5 and 34.5 mbarRMS within the combustion chamber, or
    b) a value between 20.5 and 27.5 mbarRMS external the combustion chamber.

5. The method of operating the combustion system as claimed in claim 4, wherein the value within the combustion chamber is 0.45 psiRMS, or the value external the combustion chamber is 24 mbarRMS.

6. The method of operating the combustion system as claimed in claim 1, wherein
    the fuel composition having the high-HC content is selected from the group consisting of propane, butane, pentane and hexane.

7. The method of operating the combustion system as claimed in claim 1, wherein
    at least the first fuel comprising the hydrogen content ≥5% by volume comprises a Wobbe Index >40 MJ/Nm3.

8. The method of operating the combustion system as claimed in claim 1, wherein
    at least the first fuel comprising the high-HC content >5% by volume and comprises a Wobbe Index ≥49 MJ/Nm3.

9. The method of operating the combustion system as claimed in claim 1, wherein
    the predetermined value is any one of
    a) a value between 27.5 and 34.5 mbarRMS within the combustion chamber or
    b) a value between 20.5 and 27.5 psiRMS external the combustion chamber.

10. The method of operating the combustion system as claimed in claim 9, wherein the value within the combustion chamber is 0.45 psiRMS, or the value external the combustion chamber is 24 mbarRMS.

11. The method of operating the combustion system as claimed in claim 1, wherein
    the combustion system comprises a group of combustion chambers, wherein
    the step of reducing the pilot fuel supply to zero comprises reducing the pilot fuel supply to zero for all the combustion chambers of the group of combustion chambers simultaneously.

12. The method of operating the combustion system as claimed in claim 1, wherein
    the combustion system comprises a group of combustion chambers, wherein
    the step of reducing the pilot fuel supply to zero comprises reducing the pilot fuel supply to zero for each combustion chamber independently of the other combustion chambers of the group of combustion chambers.

13. The method of operating the combustion system as claimed in claim 1, wherein a total amount of fuel is the sum of the main fuel supply and the pilot fuel supply, the total amount of fuel, supplied to each combustor is constant at a constant demanded output of the combustion system.

14. The method of operating the combustion system as claimed in claim 1, wherein the main fuel supply comprises a main fuel valve for varying the amount of a main fuel to the combustion chamber, the pilot fuel supply comprises a pilot fuel valve for varying the amount of a pilot fuel to the combustion chamber, wherein the step reducing the pilot fuel supply to zero comprises closing the pilot fuel valve and opening the main fuel valve.

15. A combustion system for a gas turbine, the combustor system comprising:

a main fuel supply, a pilot fuel supply, a combustion chamber, a controller, a fuel composition monitor for monitoring a fuel composition of the main fuel supply and/or the pilot fuel supply, a combustion monitor for monitoring combustion instability, the controller is programmed to reduce the pilot fuel supply to zero when the fuel composition has a) a hydrogen content ≥5% by volume and/or b) a high-hydrocarbon (HC) content ≥5% by volume; and further the combustion instability <a predetermined value.

16. The combustion system as claimed in claim 15, wherein the main fuel supply comprises a main fuel valve for varying the amount of a main fuel to the combustion chamber, the pilot fuel supply comprises a pilot fuel valve for varying the amount of a pilot fuel to the combustion chamber, wherein the controller is programmed to reduce the pilot fuel supply to zero by closing the pilot fuel valve.

17. The combustion system as claimed in claim 16, wherein the controller is programmed to open the main fuel valve when closing the pilot fuel valve.

18. The combustion system as claimed in claim 15, wherein a total amount of fuel is the sum of the main fuel supply and the pilot fuel supply, the total amount of fuel, supplied to each combustor 36, is constant at a constant demanded output of the combustion system.

* * * * *